(12) United States Patent
Heintzelman et al.

(10) Patent No.: US 10,741,044 B1
(45) Date of Patent: Aug. 11, 2020

(54) MONITORING SYSTEM

(71) Applicant: Honeywell International Inc., Morris Plains, NJ (US)

(72) Inventors: Christopher Heintzelman, Plymouth, MN (US); Brian Beale, Woodbury, MN (US); Soumitri Kolavennu, Blaine, MN (US); Joseph Bodkin, South Burlington, VT (US); John Cronin, Jericho, VT (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/294,775

(22) Filed: Mar. 6, 2019

(51) Int. Cl.
| | |
|---|---|
| *G08B 1/08* | (2006.01) |
| *G08B 21/02* | (2006.01) |
| *H04W 4/021* | (2018.01) |
| *G01V 8/10* | (2006.01) |
| *G01D 21/02* | (2006.01) |

(52) U.S. Cl.
CPC ........... *G08B 21/028* (2013.01); *G01D 21/02* (2013.01); *G01V 8/10* (2013.01); *H04W 4/021* (2013.01)

(58) Field of Classification Search
CPC ..... G08B 21/028; G01D 21/02; H04W 4/021; G01V 8/10
USPC .......................................... 340/539.1, 539.11
See application file for complete search history.

(56) References Cited

U.S. PATENT DOCUMENTS

| | | |
|---|---|---|
| 6,961,001 B1 | 11/2005 | Chang et al. |
| 7,046,139 B2 | 5/2006 | Kuhn et al. |
| 9,626,841 B2 | 4/2017 | Fadell et al. |
| 2010/0289643 A1* | 11/2010 | Trundle ............... G08C 19/16 340/545.1 |
| 2014/0031989 A1 | 1/2014 | Bergman et al. |
| 2015/0324943 A1 | 11/2015 | Han et al. |

FOREIGN PATENT DOCUMENTS

WO 2017176876 A1 10/2017

OTHER PUBLICATIONS

"Honeywell Introduces New All-in-one Self Monitored Smart Home Security System," Honeywell, 9 pages, Nov. 1, 2017.

* cited by examiner

*Primary Examiner* — Tanmay K Shah
(74) *Attorney, Agent, or Firm* — Shumaker & Sieffert, P.A.

(57) ABSTRACT

A monitoring system for monitoring a person comprising a first device configured to detect a first event in or near the building and a second device configured to detect a second event in or near the building is disclosed. The system may further comprise a memory for storing one or more rules each configured to identify an alert condition for a person in or near the building based on the first and/or second events in or near the building and a communications module configured to communicate with a remote device over a network. A controller may be configured to apply the one or more rules to the first and second detected events in the space to identify one or more alert conditions and determine what, if any, action is required, and if action is required, provide an alert to the remote device via the communications module.

20 Claims, 11 Drawing Sheets

| System ID | Device | Data | Time |
|---|---|---|---|
| UO908 | Electronic Door Lock | Unlocked | 3:00pm |
| UO908 | Camera 1 | Child Entered Home | 3:00pm |
| UO908 | Wi-Fi | Child Connected to Wi-Fi | 3:00pm |
| UO908 | Electronic Door Lock | Locked | 3:01pm |
| UO908 | TV | Activated | 3:02pm |
| UO908 | Doorbell Camera | Unidentified Person | 3:10pm |
| UO908 | Electronic Door Lock | Unlocked | 3:00pm |
| UO908 | Wi-Fi | Child Disconnected from Wi-Fi | 3:15pm |

FIG. 7

| System ID | Device | Data | Time |
|---|---|---|---|
| UO908 | Camera 1 | Child Entered Home | 3:00pm |
| UO908 | Wi-Fi | Child Connected to Wi-Fi | 3:00pm |
| UO908 | TV | Activated | 3:02pm |
| - | - | - | - |
| EQ112 | Wi-Fi | Child Connected to Wi-Fi | 3:00pm |
| EQ112 | Doorbell Camera | Unidentified Person | 3:10pm |
| EQ112 | Wi-Fi | Child Disconnected from Wi-Fi | 3:15pm |
| - | - | - | - |
| RT454 | Electronic Door Lock | Unlocked | 3:00pm |
| RT454 | Camera 1 | Child Entered Home | 3:00pm |
| RT454 | Electronic Door Lock | Locked | 3:01pm |
| - | - | - | - |
| - | - | - | - |
| - | - | - | - |
| - | - | - | - |
| - | - | - | - |

FIG. 9

| Threat Level | Device | Rule | Recommendation |
|---|---|---|---|
| DC1 | Door Camera | Child entering home during school hours | Notify user |
| DC2 | Door Camera | Unidentified person at door | Activate camera on user device now |
| DC3 | Door Camera | Unidentified person entering home | Call police, notify user |
| DC4 | Door Camera | Unidentified person entering home with child home alone | Call police, notify user to notify child |
| - | - | - | - |
| WF1 | Wi-Fi | Child connecting during school hours | Notify user |
| WF2 | Wi-Fi | Child disconnecting between 3:30pm-8:00pm | 2:50pm-8:30am |
| WF3 | Wi-Fi | Child disconnecting between 3:30pm-8:00pm with unidentified person rule | 2:50pm-8:30am |
| - | - | - | - |
| BM1 | Backyard Motion Sensor | Activated between 3:30pm-8:00pm | Notify user |
| BM2 | Backyard Motion Sensor | Activated between 9:00am-2:30pm | Notify user |
| BM3 | Backyard Motion Sensor | Activated between 3:30pm-8:00pm with child inside home | Notify user to contact child |
| - | - | - | - |
| LC1 | Living Room Camera | Recognized child during school hours | Notify user |
| LC2 | Living Room Camera | Unidentified person during school hours | Call police |
| LC3 | Living Room Camera | Unidentified person with child home | Call police, notify user |

FIG. 11

MONITORING SYSTEM

TECHNICAL FIELD

The disclosure generally relates to building monitoring systems, and more particularly to systems and methods for monitoring children in or near a building.

BACKGROUND

Building Automation Systems (BAS) and/or various home control systems are used to control one of more functions of a building or home. A Building Automation System and/or a home control system can include, for example, an HVAC system, a lighting control system, a fire suppression systems, a security system, and/or any other suitable building automation system. A Building Automation System and/or home control systems typically include one or more sensors and/or other devices that are operatively coupled to a central controller or the like, often via wireless communication. These sensors and/or devices may be used to monitor parameters within the building or home, including, but not limited to, temperature, humidity, motion, etc.

What would be desirable are improved methods and systems for monitoring a child (or children) or vulnerable adult(s) in a building or home.

SUMMARY

This disclosure generally relates to systems and method for monitoring a person in a building.

In a first example, a method for monitoring a child in or near a building, wherein the building includes one or more sensors each detecting a sensed condition, may comprise storing two or more rules with each rule defining a rule defined event that is detectable via one or more of the sensed conditions sensed by one or more of the sensors, a threat level associated with the rule defined event, and a recommended action to take in response to the corresponding threat level. The method may further comprise monitoring the one or more sensed conditions of the one or more sensors over time, repeatedly applying the two or more rules to the one or more sensed conditions of the one or more sensors to identify when a rule defined event of the two or more rules occurs, and performing the recommended action corresponding to the threat level associated with the rule that resulted in the rule defined event.

Alternatively or additionally to any of the examples above, in another example, the rule defined event for at least one rule may comprise an entering into the building during a predetermined time period.

Alternatively or additionally to any of the examples above, in another example, the rule defined event for at least one rule may comprise a connection of a specified device to a Wi-Fi network of the building during a predetermined time period.

Alternatively or additionally to any of the examples above, in another example, the rule defined event for at least one rule may comprise a disconnection of a specified device from a Wi-Fi network of the building during a predetermined time period.

Alternatively or additionally to any of the examples above, in another example, the one or more sensors may include a motion sensor, and wherein the rule defined event for at least one rule may comprise detection of motion during a predetermined period of time.

Alternatively or additionally to any of the examples above, in another example, the motion sensor may comprise a camera.

Alternatively or additionally to any of the examples above, in another example, the one or more sensors may include a camera, and wherein the rule defined event for at least one rule may comprise a detection of an unidentified person.

Alternatively or additionally to any of the examples above, in another example, the one or more sensors may include one or more Internet of Things (IoT) devices.

Alternatively or additionally to any of the examples above, in another example, the rule defined event for at least one rule may comprise detection of the child entering a geo-fence surrounding the building.

Alternatively or additionally to any of the examples above, in another example, a second rule defined event for the at least one rule may comprise detection of the child entering the home within a predetermined time period from the detection of the child entering the geo-fence.

Alternatively or additionally to any of the examples above, in another example, the recommended action may comprise delivering an alert to a remote device over a network.

Alternatively or additionally to any of the examples above, in another example, the alert may be delivered to a first responder.

Alternatively or additionally to any of the examples above, in another example, the recommended action may comprise activating one or more non-activated devices or sensors.

In another example, a monitoring system for monitoring a person in or near a building may comprise a first sensor configured to detect a first event in or near the building, a second sensor configured to detect a second event in or near the building, a memory for storing one or more rules each configured to identify an alert condition for a person in or near the building based on the first and/or second events in or near the building, a communications module configured to communicate with a remote device over a network, and a controller operatively coupled to the first device, the second device, the memory, and the communications module. The controller may be configured to apply the one or more rules to the first and second detected events in the space to identify one or more alert conditions and determine what, if any, action is required, and if action is required, provide an alert to the remote device via the communications module.

Alternatively or additionally to any of the examples above, in another example, the first sensor may comprise a camera.

Alternatively or additionally to any of the examples above, in another example, the second sensor may comprise a gateway device.

Alternatively or additionally to any of the examples above, in another example, the first sensor and the second sensor may be located in or on the building, the controller and the communications module may be implemented by a remote server geographically spaced from the building, and the remote device may be a portable handheld device.

Alternatively or additionally to any of the examples above, in another example, the first device and the second device may be located in or on the building, the controller and the communications module may be located in the building, and the remote device may be a portable handheld device.

In another example, a server for monitoring a person in or near a building may comprise a memory for storing two or more rules, each rule defining a rule defined event that is detectable via one or more sensed events in the space, a threat level associated with the one or more sensed events, and a recommended action to take in response to the corresponding threat level. The server may further comprise an input/output port for receiving the one or more sensed events from the space and a controller operatively coupled memory and the input/output port. The controller may be configured to monitor the one or more sensed events over time, repeatedly applying the two or more rules to the one or more monitored sensed events to identify when a rule defined event of the two or more rules occurs, and perform the recommended action defined by the threat level associated with the rule that resulted in the rule defined event.

Alternatively or additionally to any of the examples above, in another example, the one or more sensed events may comprise a presence and/or absence of the person, and wherein the rule defined event for a first rule of the two or more rules may comprise a presence of an unidentified person outside of the space, and wherein the recommended action of the first rule may comprise sending an alert to a remote device via the input/output port.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 7 is an illustrative system sensor database;

FIG. 9 is an illustrative network sensor database;

FIG. 11 is an illustrative system recommendations database.

Figure 1:
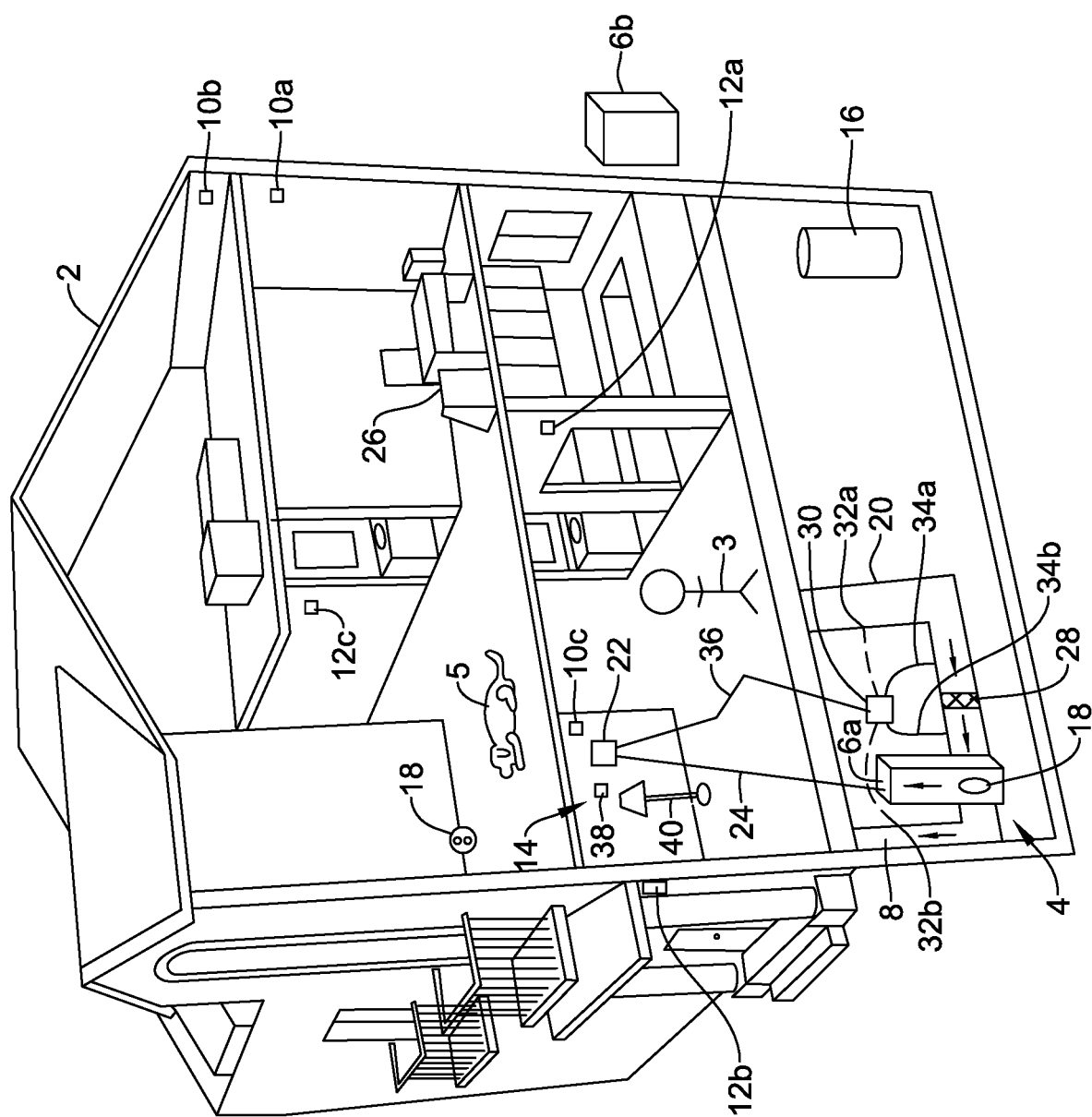
FIG. 1 is a schematic view of an illustrative building including various home automation systems.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building and/or home automation systems, and more particularly to child monitoring through the building and/or home automation system. While the system is described with respect to a child, it should be understood that the system and techniques are equally applicable to people of other ages, including, but not limited to, the elderly and/or other adults who may be considered vulnerable or in need of monitoring. For clarity, the following description will be described with respect to a home automation system including a comfort system (e.g., an HVAC system), a security system, and/or any number of Internet of Things (IoT) devices (e.g., household devices having built-in wireless connectivity, sometimes called "smart" devices or "connected" devices), however the systems and methods described herein may be applied to commercial buildings, hotels, apartment buildings, etc. The home automation system may include one or more of an HVAC system, a lighting control system, a fire suppression system, a security system, and any other suitable home automation system devices.

FIG. 1 is a schematic view of a building 2 having an illustrative heating, ventilation, and air conditioning (HVAC) system 4 and an illustrative security system 14. The building 2 may be routinely occupied by a person or people 3 and, in some cases, one or more pets 5. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6a, 6b (collectively, 6), a system of ductwork and air vents including a supply air duct 8 and a return air duct 20, and one or more controllers 22. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

The illustrative HVAC system 4 may further include one or more sensors or devices 10a, 10b (collectively, 10) configured to measure a parameter of the environment to be controlled. The one or more sensors or devices 10 may include, but are not limited to, temperatures sensors, humidity sensors, carbon dioxide sensors, occupancy sensors, proximity sensors, etc. Each of the sensor/devices 10 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

It is contemplated that the controller(s) 22 may be configured to control the comfort level in the building or structure by activating and deactivating the HVAC component(s) 6 in a controlled manner. The controller(s) 22 may be configured to control the HVAC component(s) 6 via a wired or wireless communication link 24. In some cases, the controller(s) 22 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the controller(s) 22 may be a zone controller, or may include multiple zone controllers each monitoring and/or controlling the comfort level within a particular zone in the building or other structure. As will be described in more detail herein, the controller(s) 22 may be configured to control the security system and/or other home automation devices or to communicate with separate controllers dedicated to the security system and/or other home automation devices.

In the illustrative HVAC system 4 shown in FIG. 1, the HVAC component(s) 6 may provide heated air (and/or cooled air) via the ductwork throughout the building 2. While not explicitly shown, the HVAC component(s) 6 may be in fluid communication with every room and/or zone in the building 2 via the ductwork 8 and 20, but this is not required. In operation, when a heat call signal is provided by the controller(s) 22, an HVAC component 6*a* (e.g., forced warm air furnace) may be activated to supply heated air to one or more rooms and/or zones within the building 2 via supply air ducts 8. The heated air may be forced through supply air duct 8 by a blower or fan 17. In this example, the cooler air from each zone may be returned to the HVAC component 6 (e.g. forced warm air furnace) for heating via return air ducts 20. Similarly, when a cool call signal is provided by the controller(s) 22, an HVAC component 6*b* (e.g. air conditioning unit) may be activated to supply cooled air to one or more rooms and/or zones within the building or other structure via supply air ducts 8. The cooled air may be forced through supply air duct 8 by the blower or fan 17. In this example, the warmer air from each zone may be returned to the HVAC component 6*b* (e.g., air conditioning unit) for cooling via return air ducts 20. In some cases, the HVAC system 4 may include an internet gateway or other device 26 that may allow one or more of the HVAC components, as described herein, to communicate over a wide area network (WAN) such as, for example, the Internet.

In some cases, the system of vents or ductwork 8 and/or 20 can include one or more dampers (not explicitly shown) to regulate the flow of air, but this is not required. For example, one or more dampers may be coupled to one or more controller(s) 22, and can be coordinated with the operation of one or more HVAC components 6. The one or more controller(s) 22 may actuate dampers to an open position, a closed position, and/or a partially open position to modulate the flow of air from the one or more HVAC components 6 to an appropriate room and/or zone in the building or other structure. The dampers may be particularly useful in zoned HVAC systems, and may be used to control which zone(s) receives conditioned air from the HVAC component(s) 6.

In many instances, one or more air filters 28 may be used to remove dust and other pollutants from the air inside the building 2. In the illustrative example shown in FIG. 1, the air filter(s) 30 is installed in the return air duct 20, and may filter the air prior to the air entering the HVAC component 6, but it is contemplated that any other suitable location for the air filter(s) 30 may be used. The presence of the air filter(s) 28 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 30. When provided, the equipment interface module 30 may, in addition to controlling the HVAC under the direction of the thermostat, be configured to measure or detect a change in a given parameter between the return air side and the discharge air side of the HVAC system 4. For example, the equipment interface module 30 may measure a difference in temperature, flow rate, pressure, or a combination of any one of these parameters between the return air side and the discharge air side of the HVAC system 4. In some cases, the equipment interface module 30 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 30 may include a first temperature sensor 32*a* located in the return (incoming) air duct 20, and a second temperature sensor 32*b* located in the discharge (outgoing or supply) air duct 8. Alternatively, or in addition, the equipment interface module 34 may include a differential pressure sensor including a first pressure tap 34*a* located in the return (incoming) air duct 20, and a second pressure tap 34*b* located downstream of the air filter 28 to measure a change in a parameter related to the amount of flow restriction through the air filter 28. In some cases, the equipment interface module 30, when provided, may include at least one flow sensor that is capable of providing a measure that is related to the amount of air flow restriction through the air filter 28. In some cases, the equipment interface module 34 may include an air filter monitor. These are just some examples.

When provided, the equipment interface module 30 may be configured to communicate with the controller 22 via, for example, a wired or wireless communication link 36. In other cases, the equipment interface module 30 may be incorporated or combined with the HVAC controller 22. In either case, the equipment interface module 30 may communicate, relay or otherwise transmit data regarding the selected parameter (e.g. temperature, pressure, flow rate, etc.) to the controller 22. In some cases, the controller 22 may use the data from the equipment interface module 30 to evaluate the system's operation and/or performance. For example, the controller 22 may compare data related to the difference in temperature (delta T) between the return air side and the discharge air side of the HVAC system 4 to a previously determined delta T limit stored in the controller 22 to determine a current operating performance of the HVAC system 4.

The illustrative security system 14 may include a central controller 38 and a number of sensors/devices 12*a*, 12*b*, 12*c* (collectively, 12). While the security system controller 38 is illustrated as a separate controller from the HVAC controller 22, it is contemplated that the security system controller 38 and the HVAC controller 22 may be provided as a single controller which communicates with and controls both the HVAC system 4 and the security system 14. The sensor/devices 12 may be configured to detect conditions which may be indicative of threats within and/or around the building 2. In some cases, some of the sensor/devices 12 may be constructed to detect different condition indicative of different threats. For example, some of the sensor/devices 12 may be limit switches located on doors and windows of the building 2, which are activated by entry of an intruder into the building 2 through the doors and windows. Other suitable security sensor/devices 12 may include fire, smoke, water, carbon monoxide, and/or natural gas detectors, to name a few. Still other suitable security system sensor/devices 12 may include motion sensors that detect motion of intruders in the building 2 or noise sensors or microphones that detect the sound of breaking glass. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 12 may include a video camera. In some cases, the sensor/devices 12 may include a horn or alarm, a damper actuator controller (e.g. that closes a damper during a fire event), a light controller for automatically turning on/off lights to simulate occupancy, and/or any other suitable device/sensor. These are just examples. More generally, the sensor/devices 12 may be any type of sensor or device suitable for operation in a building automation system.

During operation of the illustrative security system 14, the central controller 38 monitors the status of each of the sensor/devices 12. Upon detecting a change of status in one of the sensor/devices 12, the central controller may activate an alarm device, record and/or transmit live video from one of the sensor/devices 12, operate an actuator, contact an off-site central monitoring station (not shown), and/or perform any other suitable action.

Each of the sensor/devices 12 may be operatively connected to the central controller 38 via a corresponding communications port (not explicitly shown). It is contemplated that the communications port may be wired and/or wireless. When the communications port is wireless, the communications port may include a wireless transceiver, and the central controller 38 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The building 2 may be further provided with additional network connected or "smart" devices (e.g., WiFi enabled), also known as Internet of Things (IoT) devices. These devices may include lighting 40, home appliances 18 (such as, but not limited to, robotic vacuums, coffee pots, etc.), water heaters 16, voice activated smart speakers (e.g., AMAZON ECHO™ or GOOGLE HOME™), WiFi enabled power outlets, garage door openers, door locks, televisions, speakers, doorbells, water valves, video cameras, wearable devices, etc. Other devices in the building 2 may include, but are not limited to, a radiofrequency receiver, a thermal imager, a radar device, a lidar device, an ultrasound device, etc. It is contemplated that the additional network connected devices may be in communication with or configured to communicate or interface with the HVAC controller 22 and/or the central security controller 38. In some instances, the additional network connected devices may have one or more individual controllers which in turn communicate with the HVAC controller and/or the security controller 38.

Figure 2:
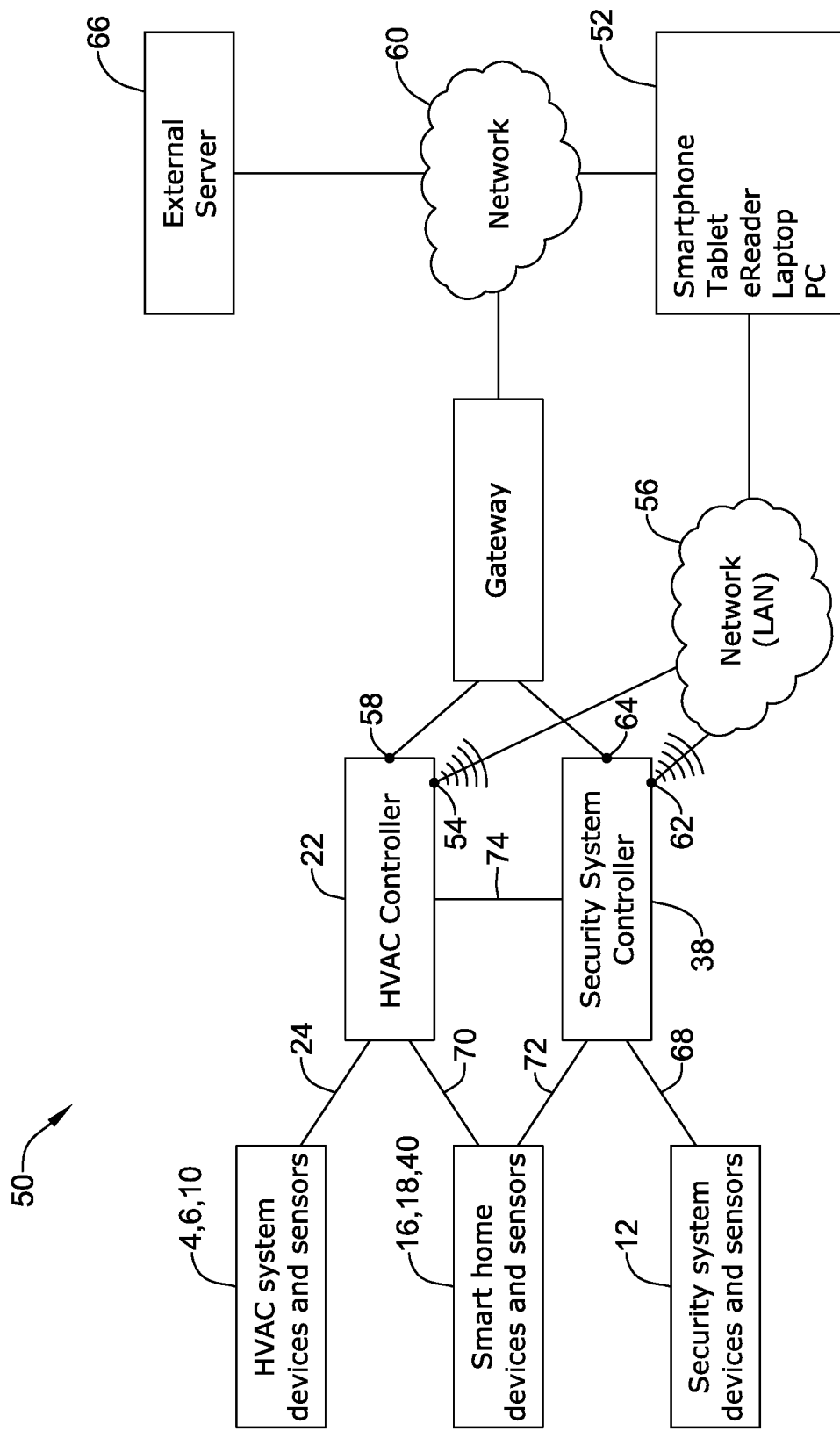
FIG. 2 is a schematic block diagram of an illustrative home or building automation system in communication with illustrative external devices and networks.

FIG. 2 is a schematic view of a home automation system 50 that facilitates remote access to, control of, and/or external communication to/from the HVAC system 4, the security system 14, and/or other home automation devices 16, 18, 40 shown in FIG. 1. The home automation system 50 may be considered a building control system or part of a building control system. The illustrative home automation system 50 includes an HVAC controller, for example, controller 22 (see FIG. 1), that is configured to communicate with and control one or more HVAC components 6 of the HVAC system 4 and a security system controller 38 (see FIG. 1) that is configured to communicate with and control one or more security sensors and/or devices 12. As discussed above, the controllers 22, 38 may be provided as separate and discrete control units or combined into a single control unit, as desired. Further, while not explicitly shown, the smart home devices and sensors 16, 18, 40 may communicate with control programs or controllers which in turn communicate with the HVAC controller 22 and/or security system controller 38. Alternatively, the smart home devices and sensors 16, 18, 40 may be configured to communicate directly with the HVAC controller 22 and/or security system controller 38.

The HVAC controller 22 may communicate with the one or more HVAC components 6 of the HVAC system 4 via a wired or wireless link 24 and with the smart home devices and sensors 16, 18, 40 (and/or the control programs thereof) via a wired or wireless link 70. Similarly, the security system controller 38 may communicate with one or more security sensors and/or devices 12 via a wired or wireless link 68 and with the smart home devices and sensors 16, 18, 40 (and/or the control programs thereof) via a wired or wireless link 72. If provided separately, it is not required for both the HVAC controller 22 and the security system controller 38 to be in communication with the smart home devices and sensors 16, 18, 40 (and/or the control programs thereof). For example, the HVAC controller 22 and the security system controller 38 may be in communication with one another via a wired or wireless link 74 such that information may be passed between the HVAC controller 22 and the security system controller 38.

Additionally, the controllers 22, 38 may communicate over one or more wired or wireless networks that may accommodate remote access and/or control of the controllers 22, 38 via another device 52 such as a smart phone, tablet, e-reader, laptop computer, personal computer, key fob, or the like. As shown in FIG. 2, the HVAC controller 22 may include a first communications port 54 for communicating over a first network 56, and in some cases, a second communications port 58 for communicating over a second network 60. Similarly, the security system controller 38 may include a first communications port 62 for communicating over the first network 56, and in some cases, a second communications port 64 for communicating over the second network 60. In some cases, the first network 56 may be a wireless local area network (LAN), and the second network 60 (when provided) may be a wide area network or global network (WAN) including, for example, the Internet. In some cases, the wireless local area network 56 may provide a wireless access point and/or a network host device that is separate from the controllers 22, 38. In other cases, the wireless local area network 56 may provide a wireless access point and/or a network host device that is part of at least one of the controller 22, 38. In some cases, the wireless local area network 56 may include a local domain name server (DNS), but this is not required for all embodiments.

In some cases, the wireless local area network 56 may be an ad-hoc wireless network, but this is not required.

In some cases, the controllers 22, 38 may be programmed to communicate over the second network 60 with an external web service hosted by one or more external web servers 66. A non-limiting example of such an external web service is Honeywell's TOTAL CONNECT™ web service. The controllers 22, 38 may be configured to upload selected data via the second network 60 to the external web service 66 where it may be collected, stored, and/or analyzed on the external web server 66. In some cases, the data may be indicative of the performance of the HVAC system 4, the security system 14, and/or the smart home devices and sensors 16, 18, 40. In other cases, the data may be indicative of building activity or lack thereof. Additionally, the controllers 22, 38 may be configured to receive and/or download selected data, settings, and/or services sometimes including software updates from the external web service over the second network 60. The data, settings and/or services may be received automatically from the web service, downloaded periodically in accordance with a control algorithm, and/or downloaded in response to a user request. In some cases, for example, the HVAC controller 22 may be configured to receive and/or download an HVAC operating schedule and operating parameter settings such as, for example, temperature set points, humidity set points, start times, end times, schedules, window frost protection settings, and/or the like from the web server 66 over the second network 60. In some instances, the controllers 22, 38 may be configured to receive one or more user profiles having at least one operational parameter setting that is selected by and reflective of a user's preferences. In still other instances, the controllers 22, 38 may be configured to receive and/or download firmware and/or hardware updates such as, for example, device drivers from the web server 66 over the second network 60. Additionally, the controllers 22, 38 may be configured to receive local weather data, weather alerts and/or warnings, major stock index ticker data, and/or news headlines over the second network 60. These are just some examples.

Depending upon the application and/or where the home automation user is located, remote access and/or control of the controllers 22, 38 may be provided over the first network 56 and/or the second network 60. A variety of remote wireless devices 52 may be used to access and/or control the controllers 22, 38 from a remote location (e.g. remote from the controllers 22, 38) over the first network 56 and/or second network 60 including, but not limited to, mobile phones including smart phones, tablet computers, laptop or personal computers, wireless network-enabled key fobs, e-readers, and/or the like. In many cases, the remote wireless devices 52 are configured to communicate wirelessly over the first network 56 and/or second network 60 with the controllers 22, 38 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, one or more application program codes (i.e., apps) stored in the memory of the remote device 52 may be used to remotely access and/or control the controllers 22, 38. Similarly, an application program code (app) may be used to remotely access and/or control the smart home devices and sensors 16, 18, 40. The application program code (app) may be provided for downloading from an external web service, such as the web service hosted by the external web server 66 (e.g., Honeywell's TOTAL CONNECT™ web service) or another external web service (e.g., ITUNES® or Google Play). In some cases, the app may provide a remote user interface for interacting with the controllers 22, 38 and/or smart home devices and sensors 16, 18, 40 at the user's remote device 52. For example, through the user interface provided by the app(s), a user may be able to change the operating schedule and operating parameter settings such as, for example, temperature set points, humidity set points, start times, end times, schedules, window frost protection settings, accept software updates and/or the like. Additionally, through the user interface provided by the app(s) the user may be able to arm and/or disarm the security system 14, view sensor status, view live or previously captured videos or still images and/or the like. Further, through the user interface provided by the app(s) the user may be able to view the status of the smart home devices and sensors 16, 18, 40, change a state of the smart home devices and sensors 16, 18, 40 (e.g., turn on/off), change a control parameter (e.g., a water heater temperature set point), and/or the like.

Communications may be routed from the user's remote device 52 to the web server 66 and then, from the web server 66 to the appropriate controller 22, 38. In some cases, communications may flow in the opposite direction such as, for example, when a user interacts directly with the controllers 22, 38 to change an operating parameter setting such as, for example, a schedule change or a set point change, or an association of a security system sensor 12 with an arming mode, etc. The change made at the appropriate controller 22, 38 may then be routed to the web server 66 and then from the web server 66 to the remote device 52 where it may reflected by the application program(s) executed by the remote device 52. In some cases, one or both controllers 22, 38 may be used to change an operating parameter in the smart home devices and sensors 16, 18, 40.

In other cases, a user may be able to interact with the controllers 22, 38 via a user interface provided by one or more web pages served up by the web server 66. The user may interact with the one or more web pages using a variety of internet capable devices to effect a change at the controllers 22, 38 as well as view usage data and energy consumption date related to the usage of the HVAC system 4, security events or status related to the security system 12, and/or information regarding the smart home devices and sensors. In still yet another case, communication may occur between the user's remote device 52 and the controllers 22, 38 without being relayed through a server. These are just some examples.

Figure 3:
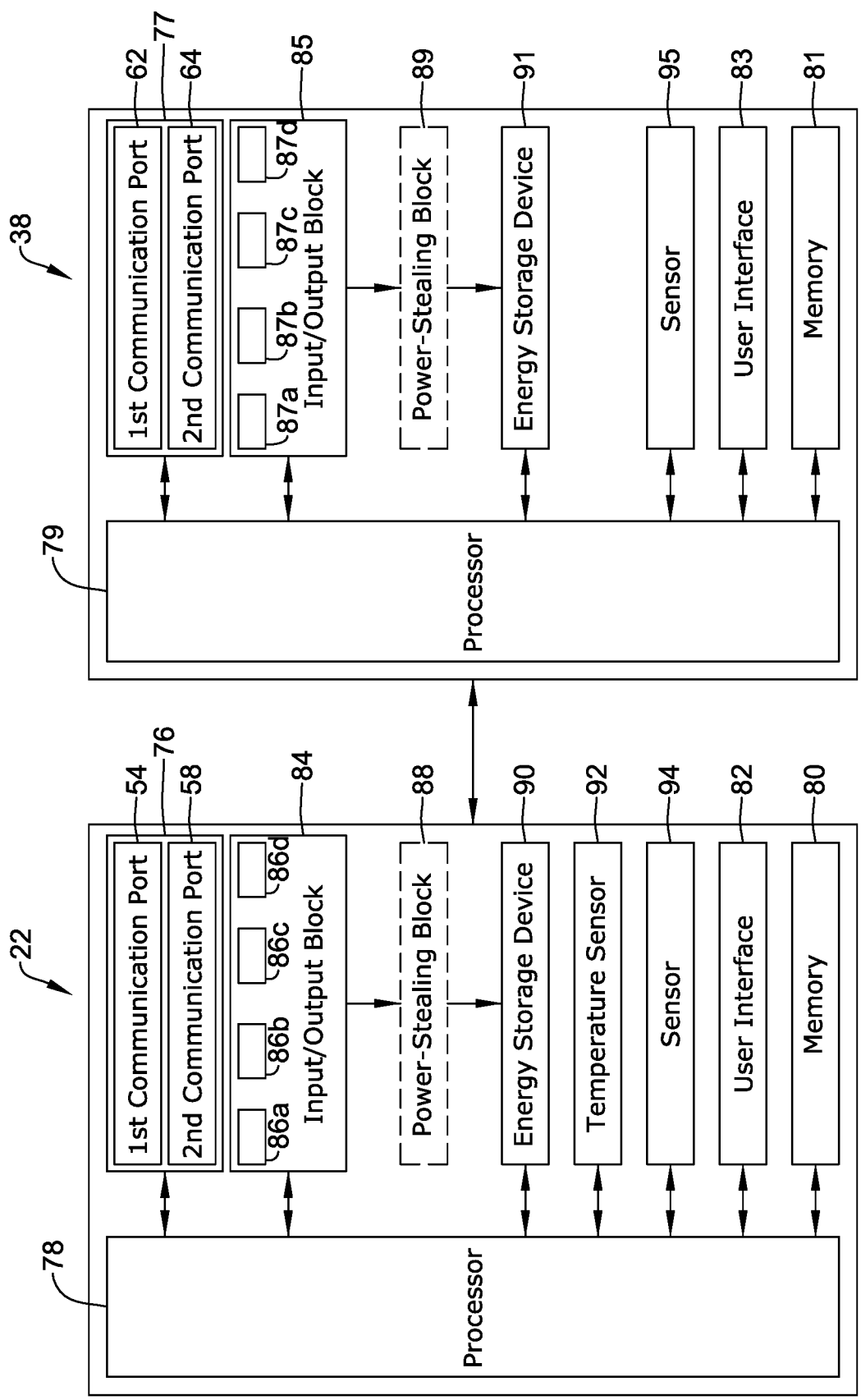
FIG. 3 is a schematic block diagram of first and second illustrative controllers.

FIG. 3 is an illustrative schematic block diagram of the HVAC controller 22 in communication with the security system controller 38 of FIG. 2. As discussed above with reference to FIG. 2, the HVAC controller 22 and/or the security system controller 38 may be accessed and/or controlled from a remote location over the first network 56 and/or the second network 60 using a remote wireless device 52 such as, for example, a smart phone, a tablet computer, a laptop or personal computer, a wireless network-enabled key fob, an e-reader, and/or the like. In some instances, the HVAC controller 22 may be a thermostat, but this is not required. As shown in FIG. 3, the HVAC controller 22 and the security system controller 38 may each include a communications block 76, 77 having a first communications port 54, 62 for communicating over a first network (e.g., a wireless LAN) and a second communications port 58, 64 for communicating over a second network (e.g., a WAN or the Internet). The first communications port 54, 62 can be a wireless communications port including a wireless transceiver for wirelessly sending and/or receiving signals over a first wireless network 56. Similarly, the second communications port 58, 64 may be a wireless communications port including a wireless transceiver for sending and/or receiving signals over a second wireless network 60. In some cases, the second communications port 58, 64 may be in communication with a wired or wireless router or gateway for connecting to the second network, but this is not required. In some cases, the router or gateway may be integral to (e.g., within) the HVAC controller 22 and/or the security system controller 38 or may be provided as a separate device. Additionally, the illustrative HVAC controller 22 and the security system controller 38 may each include a processor (e.g. microprocessor, microcontroller, etc.) 78, 79 and a memory 80, 81. The HVAC controller 22 and the security system controller 38 may each also include a user interface 82, 83, but this is not required. In some cases, only one of the HVAC controller 22 or the security system controller 38 may be provided with a user interface 82, 83. In some cases, one or both of the HVAC controller 22 and the security system controller 38 may include a timer (not shown). The timer may be integral to the processor 78, 79 or may be provided as a separate component. The respective memory 80, 81 of the illustrative HVAC controller 22 and the security system controller 38 may be in communication with the respective processor 78, 79. The memory 80, 81 may be used to store any desired information, such as the aforementioned control algorithm, set points, schedule times, diagnostic limits such as, for example, differential pressure limits, delta T limits, security system arming modes, and the like. The memory 80, 81 may be any suitable type of storage device including, but not limited to, RAM, ROM, EPROM, flash memory, a hard drive, and/or the like. In some cases, the processor 78, 79 may store information within the memory 80, 81, and may subsequently retrieve the stored information from the memory 80, 81.

In many cases, the HVAC controller 22 may include an input/output block (I/O block) 84 having a number of wire terminals (e.g. 86a-86d) for receiving one or more signals from the HVAC system 4 and/or for providing one or more control signals to the HVAC system 4. For example, the I/O block 84 may communicate with one or more HVAC components 6 of the HVAC system 4. The HVAC controller 22 may have any number of wire terminals for accepting a connection from one or more HVAC components 6 of the HVAC system 4. However, how many wire terminals are utilized and which terminals are wired is dependent upon the particular configuration of the HVAC system 4. Different HVAC systems 4 having different HVAC components and/or type of HVAC components 6 may have different wiring configurations. As such, an I/O block 84 having four wire terminals, as shown in FIG. 3, is just one example and is not intended to be limiting. In some cases, the I/O block 84 may be configured to receive wireless signals from one or more HVAC components 6 or sensors 10. Alternatively, or in addition to, the I/O block 84 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device. It is further contemplated that the I/O block 84 may communicate with another controller which controls a separate building control system, such as, but not limited to the security system controller 38.

Similarly, the security system controller 38 may include an input/output block (I/O block) 85 having a number of wire terminals (e.g. 87a-87d) for receiving one or more signals from the security system 12 and/or for providing one or more control signals to the security system 12. For example, the I/O block 85 may communicate with one or more sensors 12 of the security system 14. The security system controller 38 may have any number of wire terminals for accepting a connection from one or more sensors 12 of the security system 14. However, how many wire terminals are utilized and which terminals are wired is dependent upon the particular configuration of the security system 14. As such, an I/O block 85 having four wire terminals, as shown in FIG. 3, is just one example and is not intended to be limiting. In some cases, the I/O block 85 may be configured to receive wireless signals from one or more security sensors 12. Alternatively, or in addition to, the I/O block 85 may communicate with another controller, which is in communication with one or more controllers which controls a separate building control system, such as, but not limited to the HVAC controller 22.

In some cases, a power-transformation block 88, 89 may be connected to one or more wires of the I/O block 84, 85, and may be configured to bleed or steal energy from the one or more wires of the I/O block 84, 85. The power bled off of the one or more wires of the I/O block may be stored in an energy storage device 90, 91 that may be used to at least partially power the HVAC controller 22 or the security system controller 38. In some cases, the energy storage device 90, 91 may be capacitor or a rechargeable battery. In addition, the HVAC controller 22 and/or the security system controller 38 may also include a back-up source of energy such as, for example, a battery that may be used to supplement power supplied to the HVAC controller 22 or the security system controller 38 when the amount of available power stored by the energy storage device 90, 91 is less than optimal or is insufficient to power certain applications. Certain applications or functions performed by the HVAC controller 22 or the security system controller 38 may require a greater amount of energy than others. If there is an insufficient amount of energy stored in the energy storage device 90, 91, then, in some cases, certain applications and/or functions may be prohibited by the processor 78, 79.

The HVAC controller 22 may also include one or more sensors such as for example, a temperature sensor, a humidity sensor, an occupancy sensor, a proximity sensor, and/or the like. In some cases, the HVAC controller 22 may include an internal temperature sensor 92, as shown FIG. 3, but this is not required. The HVAC controller 22 may also communicate with one or more remote temperature sensors, humidity sensors, and/or occupancy sensors 10 located throughout the building or structure. Additionally, the HVAC controller may communicate with a temperature sensor and/or humidity sensor located outside of the building or structure for sensing an outdoor temperature and/or humidity if desired.

In some cases, the HVAC controller 22 may include a sensor 94 that is configured to determine if a user is in proximity to the building controller. Similarly, the security system controller 38 may include a sensor 95 that is configured to determine if a user is in proximity to the security system controller 38. In some cases, the sensor 94, 95 may be a motion sensor or a proximity sensor such as, for example, a passive infrared (PIR) sensor. In certain cases in which the sensor 94, 95 is a motion sensor or a proximity sensor, the sensor 94, 95 may be located remotely from the HVAC controller 22 and/or the security system controller 38 and may be in wireless communication with the HVAC controller 22 and/or the security system controller 38 via one of the communication ports.

In yet another example, the sensor 94, 95 may be configured to determine that the user is in proximity to or is expected to be in proximity to the HVAC controller 22 and/or the security system controller 38 upon detecting that the user's remote device 52 is connected to the building's wireless network which, in some cases, may be the same network to which the HVAC controller 22 and/or the security system controller 38 is also connected. Such functionality is shown and described in U.S. Patent Publication No. 2014/0031989 entitled "HVAC CONTROLLER WITH WIRELESS NETWORK BASED OCCUPANCY DETECTION AND CONTROL", the entirety of which is incorporated by reference herein for all purposes.

In still other cases, the user's remote device 52 may be configured to determine that a user is in proximity to the HVAC controller 22 and/or the security system controller 38 upon sensing a user's interaction with the HVAC controller 22 and/or the security system controller 38 via the user interface provided at the HVAC controller 22 and/or the security system controller 38. For example, the sensor 94, 95 may be configured to sense when the screen of the user interface 82, 83 is touched and/or when a button provided at the user interface 82, 83 is pressed by a user. In some cases, the sensor 94, 95 may be a touch sensitive region provided on the user interface 82, 83 when the user interface 82, 83 incorporates a touch screen display. In other cases, the sensor 94, 95 may be associated with a hard button or soft key that is provided separate from a display of the user interface 82, 83.

In some cases, upon detecting or determining that a user is in proximity to the HVAC controller 22 and/or the security system controller 38, the sensor 94,95 may deliver a signal to the processor 78, 79 indicating that the user is in proximity to the HVAC controller 22 or the security system controller 38. In other cases, upon detecting or determining that a user is in proximity to the HVAC controller 22 or the security system controller 38, the sensor 94, 95 may be configured to transmit a signal to a remote server 66 over a second network 60 via the communications block 76, 77.

The user interface 82, 83, when provided, may be any suitable user interface that permits the HVAC controller 22 or the security system controller 38 to display and/or solicit information, as well as accept one or more user interactions with the HVAC controller 22 or the security system controller 38. For example, the user interface 82, 83 may permit a user to locally enter data such as temperature set points, humidity set points, starting times, ending times, schedule times, diagnostic limits, responses to alerts, associate sensors to alarming modes, and the like. In one example, the user interface 82, 83 may be a physical user interface that is accessible at the HVAC controller 22 or the security system controller 38, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface 82, 83 may be a touch screen LCD panel that functions as both display and keypad. The touch screen LCD panel may be adapted to solicit values for a number of operating parameters and/or to receive such values, but this is not required. In still other cases, the user interface 82, 83 may be a dynamic graphical user interface.

In some instances, the user interface 82, 83 need not be physically accessible to a user at the HVAC controller 22 or the security system controller 38. Instead, the user interface 82, 83 may be a virtual user interface 82, 83 that is accessible via the first network 56 and/or second network 60 using a mobile wireless device such as one of those remote devices 52 previously described herein. In some cases, the virtual user interface 82, 83 may be provided by an app or apps executed by a user's remote device for the purposes of remotely interacting with the HVAC controller 22 or the security system controller 38. Through the virtual user interface 82, 83 provided by the app on the user's remote device 52, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the HVAC controller 22 or the security system controller 38 via a user interface 82, 83 provided by an app on the user's remote device 52 may be first transmitted to an external web server 66. The external web server 66 may receive and accept the user inputs entered via the virtual user interface 82, 83 provided by the app on the user's remote device 52, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

Rather than a dedicated app, the virtual user interface 82, 83 may include one or more web pages that are transmitted over the second network 60 (e.g. WAN or the Internet) by an external web server (e.g. web server 66). The one or more web pages forming the virtual user interface 82, 83 may be hosted by an external web service and associated with a user account having one or more user profiles. The external web server 66 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

In some cases, a user may use either the user interface 82, 83 provided at the HVAC controller 22 or the security system controller 38 and/or a virtual user interface 82, 83 as described herein. The two types of user interfaces 82, 83 that may be used to interact with the HVAC controller 22 or the security system controller 38 are not mutually exclusive of one another. However, in some cases, a virtual user interface 82, 83 may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

Figure 4:
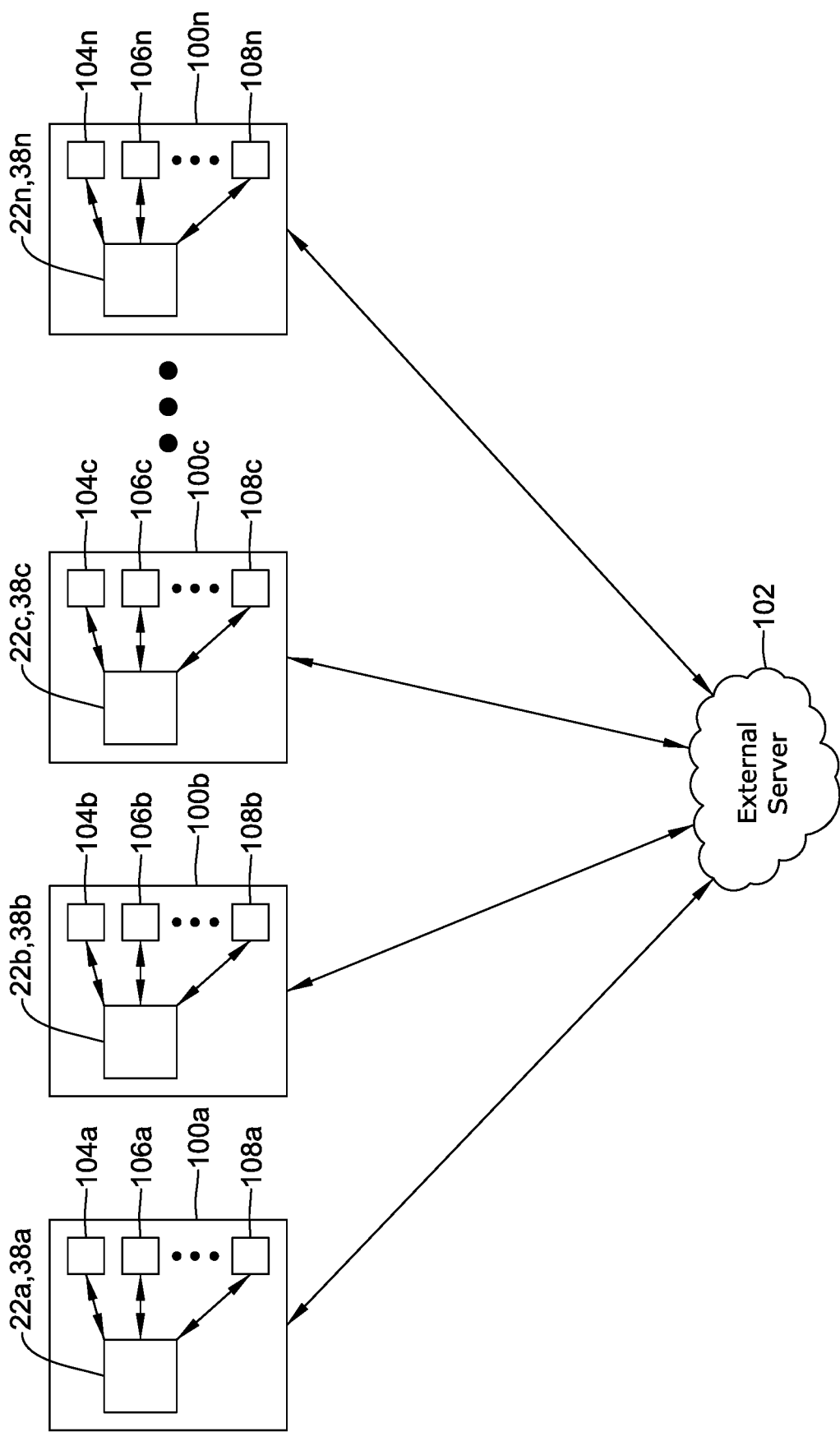
FIG. 4 is a schematic block diagram of a plurality of controllers in communication with an external server.

FIG. 4 is a schematic diagram of a plurality of buildings 100a, 100b, 100c, 100n (collectively, 100) each having one or more HVAC controllers 22a-n and/or security system controllers 38a-n in communication with an external web server 102, such as the external web server 66 described herein. It is contemplated that devices from any number of buildings 100 may be providing information to the external server 102. In some cases, hundreds, thousands, tens of thousands, or more buildings may be in communication with the external web server 102. The buildings 100a-n may each have one or more of: an HVAC system 104a-n, a security system 106a-n, or a smart home device, appliance, or sensor 108a-n such as any of those described above with respect to FIG. 1. The HVAC system 104a-n, security system 106a-n, and/or smart home devices 108a-n may be in communication with the HVAC controller 22a-n, security system controller 38a-n, a combined HVAC and security controller, or other controller configured to operate the systems and devices within the respective building 102a-n. The controllers 22a-n, 38a-n from each building may then relay performance data, operating parameters, alarm conditions, gas and/or electricity usage, etc. to the external server 102. In some cases, the data may be relayed through a WAN to the external server 102. In some cases, the external server 102 may be configured to aggregate the data obtained from the individual buildings 100. As will be described in more detail herein, once aggregated, the data can be analyzed for trends, to identify outliers, to improve algorithms, etc.

It is contemplated that the HVAC sensors 10, security system sensors 12, and/or smart home devices and sensors 16, 18, 40 may be utilized to monitor a person (e.g., person 3 illustrated in FIG. 1), for example, but not limited to, a child or a vulnerable adult that may be alone in home or building. Generally, the HVAC sensors 10, security system sensors 12, and/or smart home devices and sensors 16, 18, 40 may be analyzed to determine if there are any conditions present which may present a threat to the person home alone or a condition occurs that while not necessarily dangerous may require action on the part of a responsible adult. If a threat or other condition has been determined to be present, the system may notify a parent or other responsible party to alert them of the detected issue or problem.

Figure 5:
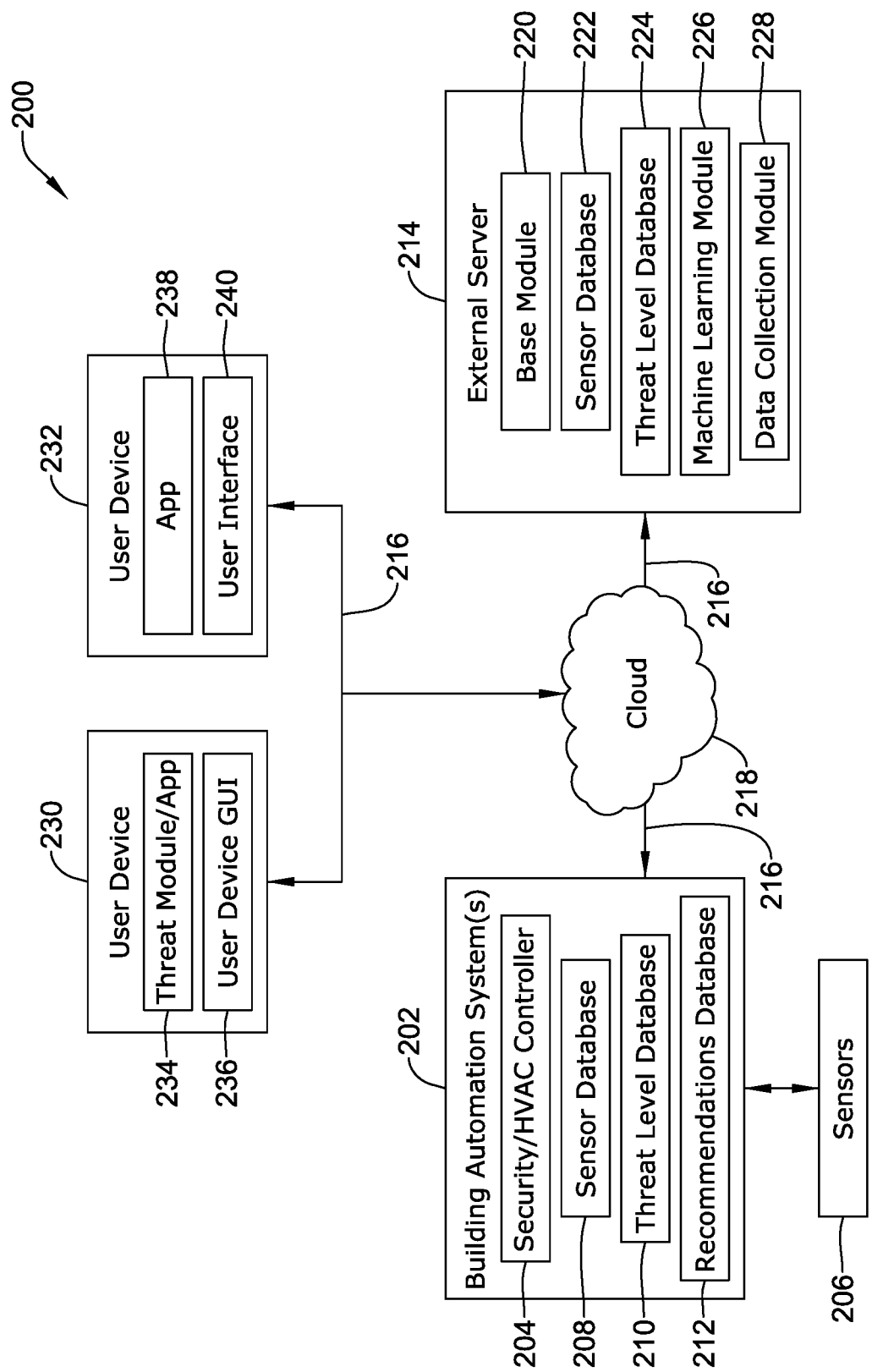
FIG. 5 is schematic block diagram of a child monitoring system.

FIG. 5 is a block diagram of an illustrative personal monitoring system 200. The system 200 may include one or more building automation systems 202 positioned within or around a building or residence. The building automation system(s) 202 may include, but are not limited to, an HVAC system, a lighting control system, a fire suppression systems, a security system, internet enabled or "smart" devices, etc. The building automation system(s) 202 include at least one controller 204, such as, but not limited to, an HVAC controller 22 and/or a security system controller 38 described herein. The controller 204 may be similar in form and function to the controllers 22, 38 described above and include the same or similar components and capabilities. The controller 204 is configured to be in communication with one or more sensors 206 that may be used to detect a condition within or near a space of the building having the building automation system(s) 202. The sensors 206 may be any type of sensor, device (including IoT devices), or detectable event suitable for operation in or use within a building automation system. The sensors 206 may include, but are not limited to, temperatures sensors, humidity sensors, carbon dioxide sensors, occupancy sensors, proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc.

The building automation system(s) 202 may maintain a first, or sensor, database 208 of data (e.g., sensed conditions or sensed events) obtained from the one or more sensors 206. For example, a memory accessible by the processor of the controller 204 may be configured to store the database 208 of sensor data such that historical and current sensor data is readily accessible. The building automation system (s) 202 may maintain a second, or threat level, database 210 including a set of rules or algorithms that may be used to identify certain conditions within or near the building or residence determine if a threat is present and a third, or recommendations, database 212 to determine what action should be taken, as will be described in more detail herein. A set of rules may include at least one rule, two or more rules, three or more rules, etc. Each rule may define one or more events that include one or more detectable conditions that when present may be indicative of an alert condition. The one or more detectable or sensed condition are indicative of a condition of the space in which the person (e.g., person 3) resides and may be data available from any of, but not limited to, the sensors 206 described herein. The space may be interior to a home or exterior to the home, as desired. The alert condition may include one of several levels of threat or perceived danger ranging from no threat to the person but rather an undesired action on the part of the person in the home (e.g., a school aged child unexpectedly home on a school day) to the person in the home being in imminent danger. Each rule may define a particular threat level which can then be compared to the recommendation database 212 to determine a recommended action to take in response to the defined event. The action may include, but is not limited to issuing one or alerts or notifications, activating additional sensors, increasing sensitivity of particular sensors, increasing measurement frequency, etc. A memory accessible by the processor of the controller 204 may be configured to store the rules database 210 and the threat database 212 such that the rules and algorithms are readily accessible.

The threat level database 210 and/or recommendations database 212 may be downloaded onto the controller 204 located within the residence from an external server(s) 214 over a network 216. The network 216 may be a wide area network or global network (WAN), such as the Internet. The external server(s) 214 may be a suite of hardware and software which may sometimes be referred to as "the cloud." In some cases, the communication may pass through an intermediary server 218 or cloud network, but this is not required. In some cases, the cloud 218 may provide the ability for communication amongst the home automation system(s) 202, the external server(s) 214, and/or one or more remote devices 230 and/or first responders 232. While the external server(s) 214 is illustrated as connected to a single building having a building automation system(s) 202, the external server(s) 214 may be connected to a plurality of building automation systems as described with respect to FIG. 4. The external server(s) 214 may collect and store data from the various sensors 206 from the one or more connected home automations systems 202. The data from the sensors 206 may be collected by a data collection module 228 and stored in a sensor database 222 at the external server(s) 214.

In some cases, sensor data as well as information regarding the people inhabiting the house or building may be stored in the sensor database 22 within the server(s) 214. Some illustrative data regarding the people may include, but is not limited to, age, associated devices, school attended, etc. As will be described in more detail herein, the base module 220 and/or a machine learning module 226 may be controllers or other modules programmed or configured to analyze the sensor data and determine if the rules stored in the threat level database 224 need to be or would be improved by updating. Additionally, or alternatively, the machine learning module 226 may be configured to store alerts sent to a user and/or first responder along with the corresponding sensor data that triggered the recommendation. This data may be analyzed to determine if adjustments to the rules in the threat level database 224 should be made.

Returning to the home automation system(s) 202, the sensor data may be analyzed to determine if a child is securely in the home. For example, in one illustrative embodiment, the child may be determined to be securely in the home if a one or more specified criteria have been met. These criteria may include the child crossing a geofence border near the home, detection of the child using facial recognition, mobile devices connecting to a home network (e.g., a home's Wi-Fi network), accessing an IoT home entry device, etc. In another illustrative example, the sensor data may be analyzed to determine if any events have occurred that may indicate the child is not in the home. These events may include a child not crossing a geofence border by an expected time, the detection of an unidentified person with the child, mobile devices disconnecting from a home network, etc. One or more rules may be present which define events or combinations of detected events or conditions that will define an alert condition. The alert condition is not necessarily limited to a distress situation. For example, a user (e.g., parent or guardian) may choose to be notified when the child has arrived home or has done something that while not placing the child in imminent danger, a user would desire to know. In some cases, the processing of the sensor data and comparison of the data to the threat level database 210 and/or recommendations database 212 may be performed in the cloud 218 or remote from the controller 204, although this is not required. If the data from the sensors 206 indicates that one or more conditions or events have occurred that provide confirmation that a child is secure or that a child may in an unsecure environment (as determined by comparing the data to the threat level database 210 and/or recommendations database 212), the controller 204 determines that a recommendation or notification should be sent to the user via a remote user device 230 and/or directly to a first responder user device 232. A first responder may be someone designated or trained to respond to an emergency and may include, but is not limited to, the police which is the civil force of a national or local government, responsible for the prevention and detection of crime and the maintenance of public order, the fire department which is the department of a local or municipal authority in charge of preventing and fighting fires, and/or paramedics which are a person trained to give emergency medical care to people who are seriously ill with the aim of stabilizing them before they are taken to the hospital.

The remote devices 230, 232 may be any internet connected device including a smart phone, tablet, e-reader, laptop computer, personal computer, etc. In some cases, the first responder remote device 232 may be a central dispatch facility such as an emergency call center. The notification may be received by an application program code (app) or other module 234, 238 within the remote devices 230, 232. In some cases, for example, if a threat to the child is deemed severe, the notification may be sent to both the parent, guardian, or other responsible adult and the first responder simultaneously. In other cases, the notification may be sent to only one of the parent, guardian, or other responsible adult or the first responder. It is contemplated that the parent, guardian, or other responsible adult may customize who receives notifications and when through the user app 234 or controller 204. For example, the parent, guardian, or other responsible adult may choose to be notified first and attempt contact with the child before subsequently notifying a first responder. Alternatively, or additionally, the first responder may be notified if the parent, guardian, or other responsible adult fails to acknowledge the alert. Once the notification has been received at the notification module, the notification may be displayed on a user interface 236, 240 of the device 226, 228. In some cases, an audio alert (e.g., a beep or chime) or a haptic alert (e.g., a vibration) may accompany the notification to alert the user of the notification.

It is contemplated that the threat level database 210 and/or recommendations database 212 for a particular building may be tailored to the people residing in the building. For example, the threat level database 210 and/or recommendations database 212 may include a plurality of rules established for a household's ages, expected habits, geographical area, etc. For example, older children may be expected to be have more flexibility in arrival to and/or departure from a home. The network threat level database 224 may include a plurality of different rules sets tailored to different household characteristics. The appropriate set of rules may be downloaded to the controller 204 in response to a user identifying the details of the child (or vulnerable adult) to the controller 204. The user may enter household details at the user interface of the controller 204, through a remote device, or through a web client, as described above.

Figure 6:
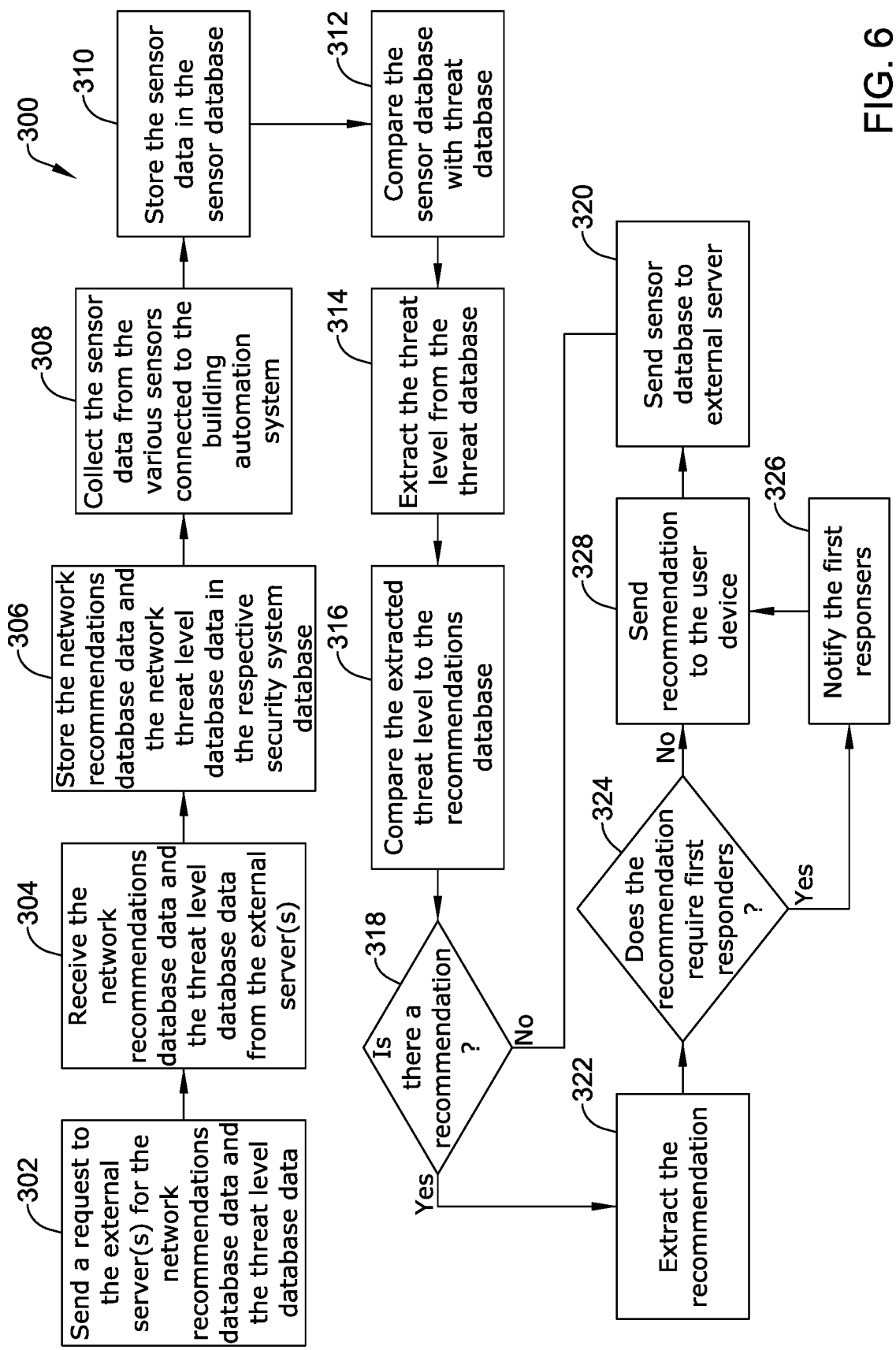
FIG. 6 is a flow chart of an illustrative method for monitoring a child or vulnerable adult.

FIG. 6 illustrates a flow chart 300 of an illustrative method for determining if alert condition is present and if a notification should be issued. To begin, the user may use the controller 204 (or a remote device 226) to send a request to the external server(s) 214 to obtain the threat level database including the rules and/or the recommendations database, as shown at block 302. Alternatively, or additionally, the controller 204 may be configured to automatically request the threat level database including the rules and/or the recommendations database. The user may provide information related to the household (e.g., number and age of occupants, etc.) along with the request. The external server(s) 214 may determine which particular set of rules in the network threat level database 224 most closely align with the characteristics of the user's household. The external server(s) 214 may then send the appropriate set of rules and recommendations back to the controller 204, as shown at block 304. The rules and recommendations received at the controller 204 may be stored within their respective database in the controller 204 or in a remote location (e.g., a cloud network), as shown at block 306. In some cases, the threat level database including the rules and the recommendations database may be combined into a single database at the controller 204 and/or remote location, as desired. It is contemplated that the user may initiate a request for rules or updated rules on demand or as desired. Alternatively, or additionally, the controller 204 may be configured to automatically request the most up-to-date rules from the external server(s) 214 at predetermined time schedules. It is further contemplated that additionally, or alternatively, the external server(s) 214 may be configured to automatically send or push revised rules to the controller 204 as the rules are updated. For example, the external server(s) 214 may keep a log of which controller 204 has which set of rules. As individual sets of rules are updated in response to user feedback, alarm conditions, or machine learning, the external server(s) 214 may automatically deliver the revised rules to the controller 204.

The controller 204 may collect data from one or more sensors 206, as shown at block 308. It is contemplated that the controller 204 may be configured to collect data in response to a particular event, such as, but not limited to the disarming of a security system, an HVAC system entering a "home" mode, a detection of a person or persons, a remote device entering a predetermined geographical location (e.g., a geofence), activation of a button on the controller 204, etc. Alternatively, or additionally, the sensors 206 may continually collect data. The sensors 206 may be configured to sense a condition within the building or a particular room of the building. Some illustrative conditions may include, but are not limited to, motion, facial recognition, activation/deactivation of IoT devices (e.g., door locks, televisions, etc.), connection and/or disconnection of devices to the home network, devices entering/leaving a geofence, etc. As the controller 204 collects data from the one or more sensors 206, the data is stored in the sensor database 208, as shown at block 310. The sensor database 208 may be integral to the controller 204 or may be stored in a cloud network 216, as desired.

Referring briefly to FIG. 7, which illustrates an example sensor database 400, the sensor database 400 may record additional information beyond the measured or perceived parameter. The sensor database 400 may record the system identification 402. The system identification 402 may tie the data to a particular controller 204 such that data can be aggregated with other systems having similar household demographics. For example, the data collection module 228 and/or the machine learning module 226 of the external server(s) 214 may link home automations systems 202 have similar household demographics (although other criteria may be used, as desired) such that the data can be aggregated correctly and used to refine the appropriate set of rules, as will be described in more detail herein. The sensor database 400 may also record the name 404 of the sensor 206. While not explicitly shown, the sensor database 400 may also record the location of the sensor 206. This may allow different rules to be applied to specific sensors 206. The sensor database 400 also records the actual data 406 received from the sensor 206. The data may be binary (e.g., on/off, yes/no, enter/exit, etc.) or a numerical value. Additionally the time 408 the data was obtained is also recorded. In some cases, a length of time a reading is valid may also be recorded.

Returning to FIG. 6, the sensor database 208 may be compared to the threat level database 210, as shown at block 312. It is contemplated that the storage of information and the processing thereof may be performed within the controller 204, within a dedicated module in the controller 204, or remotely from the controller 204, as desired. This may be performed at predefined time intervals or in response to a particular sensor reading, or other triggering event. As the sensor database 208 is compared to the threat level database 210, if the sensor data matches a rule, a threat level may be extracted from the threat level database 210, as shown at block 314. The extracted threat level may then be compared to the recommendations database 212, as shown at block 316. The controller 204 may then determine if there is a recommendation for the detected events, as shown at block 318. If there is not a recommendation, the data from the sensor database 208 may be sent to the external server(s) 214 and the collection of sensor data (block 308), storage of sensor data (block 310), and comparison of collected data to rules (block 312) will continue. In other words, the rules will be repeatedly applied to the collected data to identify when a rule defined event occurs. If there is a recommendation, the recommendation may be extracted from the recommendations database 212, as shown at block 322.

The controller 204 may then perform the recommended action defined in the recommendations database 212. For example, the controller 204 may first determine if the recommendation requires first responders, as shown at block 324. If first responders are required, the controller 204 may send an alert, a notification and/or the event triggering the alert to the first responders, as shown at block 326. After notification of the first responders, or substantially simultaneously therewith, an alert, a notification and/or the event triggering the alert may be sent to the user device 230, as shown at block 328. After notification of the user, or substantially simultaneously therewith, the sensor database 208 may be sent to the external server(s) 214, as shown at block 320, where it is stored and can be used to improve the network threat level database 224. Additionally, or alternatively, the user may provide feedback regarding the status of the child or vulnerable adult in the conditions that generated the alarm event or notification. In some cases, the external server(s) 214 may be configured to poll the controller 204 for sensor data without an alarm event.

Returning to block 324, if the recommendation does not require first responders, the controller 204 may send an alert, a notification and/or the event triggering the alert to the user device 230, as shown at block 328. In some cases, the controller 204 may be configured to notify one or more user devices. It is further contemplated that some user devices may be notified only after a primary user device has failed to acknowledge the alert. After notification of the user, or substantially simultaneously therewith, the sensor database 208 may be sent to the external server(s) 214, as shown at block 320, where it is stored and can be used to improve the network threat level database 224. Additionally, or alternatively, the user may provide feedback regarding the status of the child or vulnerable adult in the conditions that generated the alarm event or notification. In some cases, the external server(s) 214 may be configured to poll the controller 204 for sensor data without an alarm event.

Figure 8:
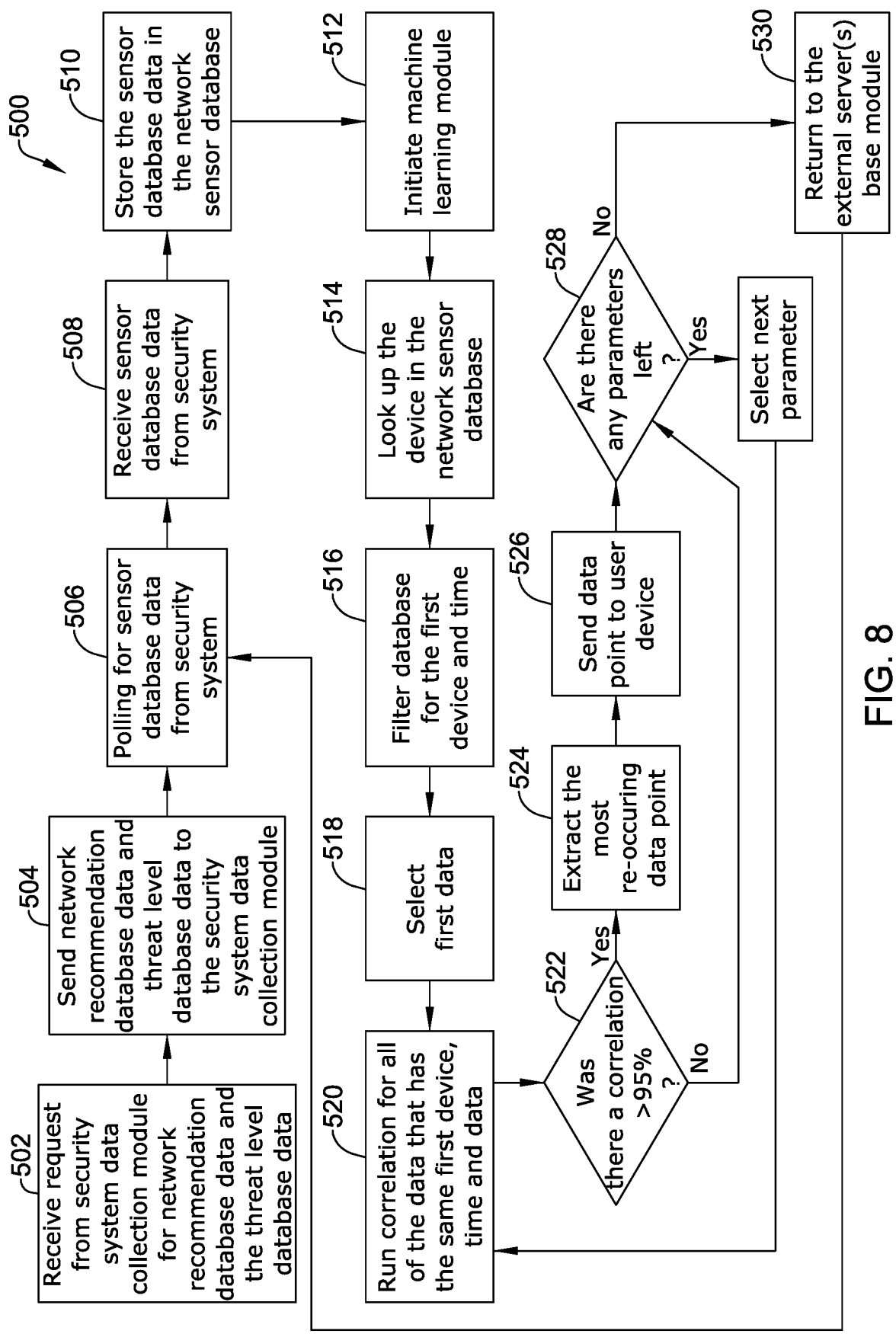
FIG. 8 is a flow chart of an illustrative method for updating and refining the network threat level database.

FIG. 8 illustrates a flow chart 500 of an illustrative method for updating and refining the network threat level database 224 located in the external server(s) 214. As described above, the network threat level database 224 may be developed and refined based on a network sensor database 222 that is an aggregation of one or more (e.g., as discussed with respect to FIG. 4) individual sensor databases 208. The process 500 may begin by the base module 220 of the external server(s) 214 receiving a request from an individual home automation system 202 to receive the threat level database and recommendations data from the threat level database 224, as shown at block 502. As described herein, the base module 220 may be configured to select and send an appropriate set of rules and recommendations based on the system 202 requesting the data, as shown at block 504. The base module 220 may be configured to initiate a data collection module 228 to continuously or intermittently poll the home automations system(s) 202 for sensor data, as shown at block 506. In some cases, the home automation system(s) 202 may send the sensor data without a request from the base module 220 of the external server(s) 214. In some cases, the data collection may be performed by the base module 220. The base module 220 may receive the data from the home automation system(s) 202, as shown at block 508 and store the data in a network sensor database 222, as shown at block 510.

Referring briefly to FIG. 9, which illustrates an example network sensor database 600, the network sensor database 222 may record additional information beyond the measured or perceived parameter. The network sensor database 222 may record the system identification 602. The system identification 602 may tie the data to a particular controller 204 or unique home automation system 202 such that data can be aggregated with other systems. In some cases, the data may be aggregated with data from other systems having similar demographics, although this is not required. For example, the data collection module 228 and/or the machine learning module 226 of the external server(s) 214 may link home automations systems 202 having similar household demographics (although other criteria may be used, as desired) such that the data can be aggregated correctly and used to refine the appropriate set of rules, as will be described in more detail herein. The network sensor database 222 may also record the name and/or type 604 of device 206. While not explicitly shown, the network sensor database 222 may also record the location of the sensor 206. This may allow different rules to be applied to specific sensors 206. The network sensor database 222 also records the actual data 606 received from the sensor 206. The data may be binary (e.g., on/off, yes/no, enter/exit, etc.) or a numerical value. Additionally the time 608 the data was obtained is also recorded. In some cases, a length of time a reading is valid may also be recorded.

Returning to FIG. 8, after the sensor data has been stored in the network sensor database (block 510), the base module 220 may initiate the machine learning module 226, as shown at block 512. The machine learning module 226 may include one or more correlation engines to correlate the sensor and threat data. For example, the machine learning module 226 may analyze the data to determine if a series of missed expected activities (e.g., unlocking of a door, connection of a device to a network, etc.) would warrant a higher threat level than previously allowed or vice versa. To begin, the machine learning module 226 may look up a first device (for example, but not limited to, an outdoor motion detector) in the network sensor database 222, as shown at block 514. In some cases, the network sensor database 222 may be filtered for the first device, time, and/or data recorded as shown at block 516. For example, the data may be filtered by the occurrence of a specific event (e.g., the activation of an outdoor motion detector) or a specific time. The machine learning module 226 may then select a particular data reading (e.g., the child coming home), as shown at block 518. The machine learning module 226 may then run a correlation analysis for all of the data that has the same time recorded and data (e.g., child coming home), as shown at block 520. The machine learning module 226 may then determine if a there was a correlation between the first device and other parameters, as shown at block 522. In some cases, the parameters may be considered to be correlated if a linear regression analysis using the least squares method results in a correlation factor above a predetermined threshold. The predetermined threshold may be any threshold desired, such as, but not limited to 75% or greater (e.g., R=0.75 or greater), 85% or greater (e.g., R=0.85 or greater), 95% or greater (e.g., R=0.95 or greater), etc. These are just some examples.

If there is a correlation, the machine learning module 226 may extract the most re-occurring data point (for example, the most re-occurring data point for the outdoor motion detector may be a backyard motion detector being activated around 4 pm), as shown at block 524. The most re-occurring data point may then be sent to the user (e.g., at the controller 204 and/or the user the device 230), as shown at block 526. This may allow the user to view the most re-occurring data point for a particular sensor and/or the correlated data such that the user can adjust the rules in the threat level database 210 to customize the alerts for their specific needs. For example, if the backyard motion detector is constantly being activated around 4 pm at a time when the child (or children) are coming home from school then it may be safe to assume that the child (or children) are the ones activating it and the threat level could be decreased.

Returning to block 522, if there is no correlation, the machine learning module 226 may check for other parameters that may have the same device time and data, as shown at block 528. Similarly, after a data point has been sent to the user (block 526), the machine learning module 226 may check for other parameters that may have the same device time and data, as shown at block 528. If there are no additional parameters, control may return to the base module, as shown at block 530. The process may then be repeated with the base module 220 once again polling the home automations system(s) 202 for sensor data, as shown at block 506. Returning to block 528, if there are additional parameters for which a correlation has not been run, the machine learning module 226 may select the next parameter for a correlation analysis, as shown at block 532. The correlation process may then be performed on the next selected parameter, beginning at block 520. The correlation process may continue until there are no parameters left.

Figure 10:
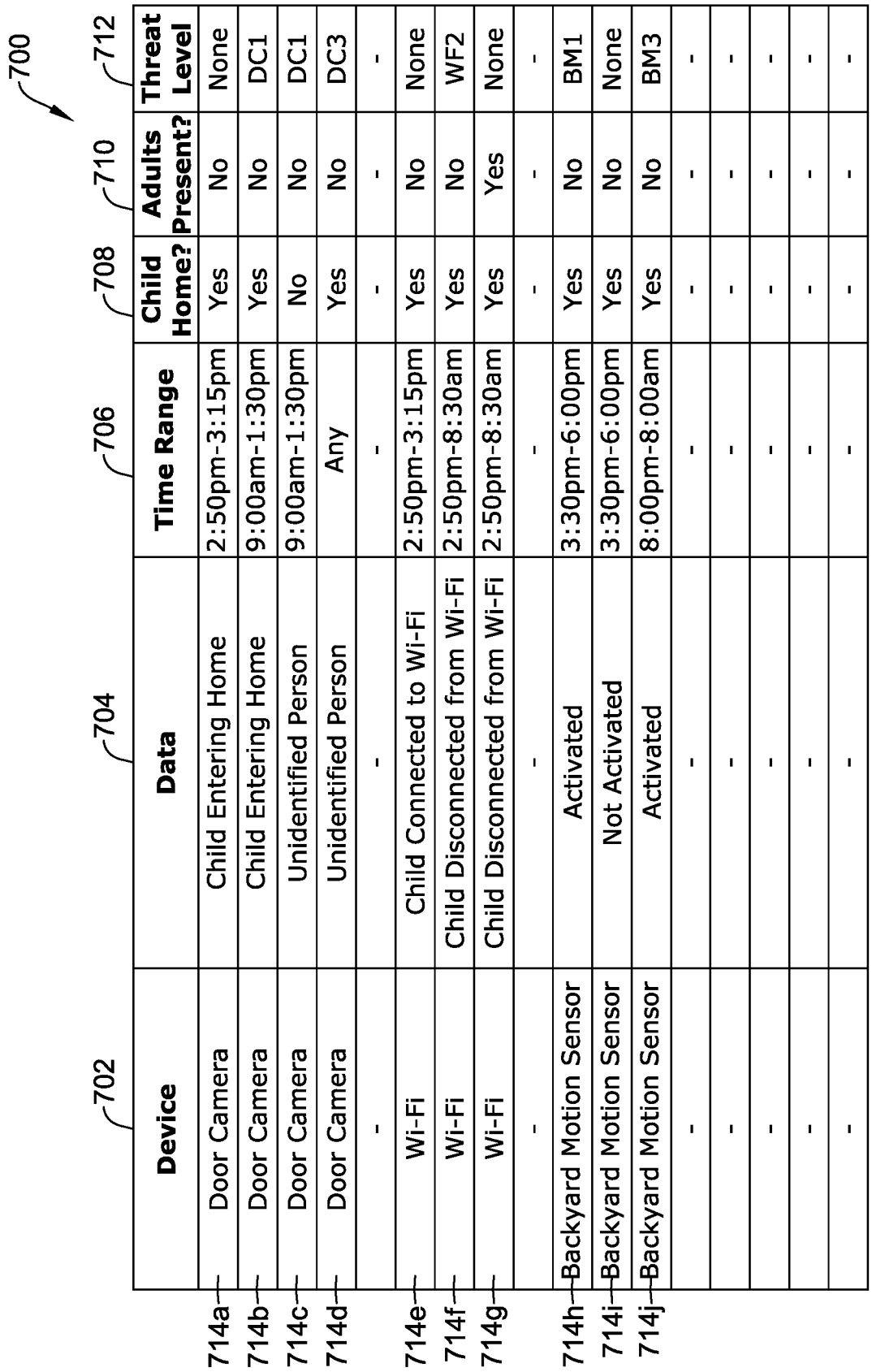
FIG. 10 is an illustrative system threat level database.

FIG. 10 illustrates an example system threat level database 700. The network threat level database 224 may be similar to the system rules database but may include additional rules or sets of rules which may not be applicable to a particular building automation system 200. The threat level database 700 illustrated in FIG. 10 is not intended to provide a complete listing of the events which may result in a recommended action. Instead, the threat level database 700 is provided as an example of some rules that may be generated for monitoring a child or vulnerable adult. The threat level database 700 may include a device or sensor name and/or location 702, the data from said device 704, a time range to apply the rule 706, if the child is present in the home 708, if an adult is present in the home 710, and the threat level 712. Each row 714a-j (collectively, 714) of the threat level database may be a rule defining one or more events and a corresponding threat level. It is contemplated that the threat level of a same data reading (e.g., a child disconnecting from Wi-Fi) during a same time period may result in a different threat level (for example, a reduced threat or no threat) if an adult is present as compared to when an adult is not present (see, for example, rows 714f and 714g).

In some cases, the data from a single device meeting a predetermined criteria may be sufficient to generate an alert.

In other cases, the combined data from two or more sensors or devices meeting predetermined criteria may generate a recommendation. Some events that may result in an alert may include, but are not limited to, a child (or vulnerable adult) entering the home at an expected and/or unexpected time (e.g., using door cameras, motion detectors, geo-fences, smart locks, garage doors, a detected connection to Wi-Fi via the child's device, use of a television or other smart devices, etc.), an unidentified person exterior to the home or entering the home (e.g., using cameras), a child (or vulnerable adult) leaving the home at an unexpected time (e.g., using door cameras, motion detectors, smart locks, garage doors, geo-fences, a detected disconnection of the child's device from a Wi-Fi network, etc.), a child (or vulnerable adult) not arriving home at an expected time (e.g., using door cameras, motion detectors, smart locks, garage doors, geo-fences, no detected connection of the child's device from a Wi-Fi network, no use of smart devices in the home, etc.), unexpected motion surrounding the house (e.g., using motion detectors, cameras, etc.). It should be understood that the above listing of events is not intended to be comprehensive but rather illustrative of some events that can be monitored using a building automation system 202 to determine the perceived safety of the occupants (e.g., in some cases a child or vulnerable adult) of the house or building. Each rule 714 may include an associated threat level 712. The threat level 712 may include no threat situations and have incremental increases in the threat. As the threat level increases, the recommended response or automatic action taken may increase in urgency as well. The threat level database 700 may include a code for the particular threat level 712 associated with rule 714.

As described with respect to FIG. 6, the controller 204 may first compare sensor data to the threat level database 700. If the sensor data matches a rule 714, the threat level 712 is extracted from the database. As shown in FIG. 10, the threat level 712 may be stored as an abbreviation or code. The threat level 712 is then compared to the recommendations database. An illustrative system recommendations database 800 is shown in FIG. 11. The recommendations database 800 may include the threat level 802, the device or sensor associated with the detected event 804, the detected event or rule 806, and a recommendation 808. It is contemplated that the recommendations database 800 may include only the threat level 802 and the recommendation 808. In other embodiments, the recommendations database 800 may include additional information or data associated with a particular threat level 802. In some cases, the threat level 802 may be associated with a particular device or sensor 804. This may facilitate the ability to customize rules and threats for a particular household. However, this is not required. It is contemplated that the system may use the same threat level codes 802 for different devices 804 having the same recommendation 808. Some illustrative recommendations may include, but are not limited to, notifying the user via the user device 230, displaying device data to the user (e.g., transmitting a camera feed to the remote device 230), transmitting a message or phone call to the first responders, transmitting a message to the user via the user device 230 alerting the user to notify the child and/or combinations thereof. It should be understood that the above listing of recommendations is not intended to be comprehensive but rather illustrative of some of the recommendations and/or actions that can be taken in response to a detected event 806.

The recommendation and/or action 808 may be specific to the sensed condition and the perceived severity of the situation. For example, in some cases, only the user (e.g., parent or responsible adult) is notified. In other cases, the user is notified as well as a first responder (such as, but not limited to, the police). In some cases, the recommendations may be informational (e.g., a child is home when they should be at school), while in other cases, the recommendation may require an action on the part of the user or the first responder. Regardless of whether the recommendation is providing information, suggesting an action, or performing an action (e.g., notifying the police), the recommendation may be provided to the remote device of the user and/or the first responder, as defined in the rule. When a message is transmitted to the user and/or the first responders, the message may include, but is not limited to the address of the home, the event which prompted the message, who is present in the home, etc. It is further contemplated that in some cases, the recommendation may require the controller 204 to activate one or more additional devices or sensors.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:
1. A method for monitoring a child in or near a building, wherein the building includes one or more sensors each detecting a sensed condition, the method comprising:
storing two or more rules, each rule defining:
a rule defined event that is detectable via one or more of the sensed conditions sensed by one or more of the sensors;
a threat level associated with the rule defined event, wherein the threat level corresponds to an amount of risk to the child in or near the building due to an occurrence of the rule defined event, and wherein the threat level is within a range of threat levels from a minimum threat level to a maximum threat level, the minimum threat level corresponding to zero risk to the child and the maximum threat level corresponding to a maximum risk to the child; and
a recommended action to take in response to the corresponding threat level of the range of threat levels;
monitoring the one or more sensed conditions of the one or more sensors over time;
repeatedly applying the two or more rules to the one or more sensed conditions of the one or more sensors to identify when a rule defined event of the two or more rules occurs; and performing the recommended action corresponding to the threat level associated with the rule that resulted in the rule defined event.

2. The method of claim 1, wherein the rule defined event for at least one rule comprises an entering into the building during a predetermined time period.

3. The method of claim 1, wherein the rule defined event for at least one rule comprises a connection of a specified device to a Wi-Fi network of the building during a predetermined time period.

4. The method of claim 1, wherein the rule defined event for at least one rule comprises a disconnection of a specified device from a Wi-Fi network of the building during a predetermined time period.

5. The method of claim 1, wherein the one or more sensors include a motion sensor, and wherein the rule defined event for at least one rule comprises detection of motion during a predetermined period of time.

6. The method of claim 5, wherein the motion sensor comprises a camera.

7. The method of claim 1, wherein the one or more sensors include a camera, and wherein the rule defined event for at least one rule comprises a detection of an unidentified person.

8. The method of claim 1, wherein the one or more sensors include one or more Internet of Things (IoT) devices.

9. The method of claim 1, wherein the rule defined event for at least one rule comprises detection of the child entering a geo-fence surrounding the building.

10. The method of claim 9, wherein a second rule defined event for the at least one rule comprises detection of the child entering the home within a predetermined time period from the detection of the child entering the geo-fence.

11. The method of claim 1, wherein the recommended action comprises delivering an alert to a remote device over a network.

12. The method of claim 11, wherein the alert is delivered to a first responder.

13. The method of claim 1, wherein the recommended action comprises activating one or more non-activated devices or sensors.

14. A monitoring system for monitoring a person in or near a building, the monitoring system comprising:
    a first sensor configured to detect a first event in or near the building;
    a second sensor configured to detect a second event in or near the building;
    a memory for storing one or more rules each configured to identify an alert condition for a person in or near the building based on the first and/or second events in or near the building;
    a communications module configured to communicate with a remote device over a network; and
    a controller operatively coupled to the first sensor, the second sensor, the memory, and the communications module, the controller configured to:
        apply the one or more rules to the first and second detected events in the space to identify one or more alert conditions, wherein each alert condition of the one or more alert conditions corresponds to an amount of risk to the person in or near the building due to an occurrence of the respective alert conditions, wherein the amount of risk ranges from a minimum amount of risk to a maximum amount of risk, the minimum amount of risk corresponding to zero risk to the person; and
        determine what, if any, action is required, and if action is required, provide an alert to the remote device via the communications module.

15. The monitoring system of claim 14, wherein the first sensor comprises a camera.

16. The monitoring system of claim 14, wherein the second sensor comprises a gateway device.

17. The monitoring system of claim 14, wherein the first sensor and the second sensor are located in or on the building, the controller and the communications module are implemented by a remote server geographically spaced from the building, and the remote device is a portable handheld device.

18. The monitoring system of claim 14, wherein the first device and the second device are located in or on the building, the controller and the communications module are located in the building, and the remote device is a portable handheld device.

19. A server for monitoring a person in or near a building, the server comprising:
    a memory for storing two or more rules, each rule defining:
        a rule defined event that is detectable via one or more sensed events in the space;
        a threat level associated with the one or more sensed events, wherein the threat level corresponds to an amount of risk to the child in or near the building due to an occurrence of the rule defined event, and wherein the threat level is within a range of threat levels from a minimum threat level to a maximum threat level, the minimum threat level corresponding to zero risk to the child and the maximum threat level corresponding to a maximum risk to the child; and
        a recommended action to take in response to the corresponding threat level of the range of threat levels;
    an input/output port for receiving the one or more sensed events from the space; and
    a controller operatively coupled memory and the input/output port, the controller configured to:
        monitor the one or more sensed events over time;
        repeatedly applying the two or more rules to the one or more monitored sensed events to identify when a rule defined event of the two or more rules occurs; and
        perform the recommended action defined by the threat level associated with the rule that resulted in the rule defined event.

20. The server of claim 19, wherein the one or more sensed events comprises a presence and/or an absence of the person, and wherein the rule defined event for a first rule of the two or more rules comprises a presence of an unidentified person outside of the space, and wherein the recommended action of the first rule comprises sending an alert to a remote device via the input/output port.

* * * * *